United States Patent
De Potter et al.

(10) Patent No.: US 10,677,391 B2
(45) Date of Patent: Jun. 9, 2020

(54) GAS SUPPLY DEVICE

(71) Applicant: L'Air Liquide, Société Anonyme pour l'Etude et l'Exploitation des Procédés Georges Claude, Paris (FR)

(72) Inventors: Romuald De Potter, Taverny (FR); Renaud Ligonesche, Herblay (FR); Antoine Frenal, Ezanville (FR); Denis Muller, Rueil Malmaison (FR); Philippe Bernard, Goincourt (FR); Samuel Vignerol, Fonntenay le Fleury (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 316 days.

(21) Appl. No.: 15/648,800

(22) Filed: Jul. 13, 2017

(65) Prior Publication Data
US 2018/0017215 A1 Jan. 18, 2018

(30) Foreign Application Priority Data
Jul. 13, 2016 (FR) ...................................... 16 56731

(51) Int. Cl.
*F17C 13/02* (2006.01)
*F17C 5/00* (2006.01)
(Continued)

(52) U.S. Cl.
CPC ................ *F17C 13/02* (2013.01); *F17C 5/00* (2013.01); *F17C 7/00* (2013.01); *F17C 13/084* (2013.01);
(Continued)

(58) Field of Classification Search
CPC .... F17C 5/00; F17C 7/00; F17C 13/02; F17C 13/084; F17C 2201/0104; F17C 2201/032;
(Continued)

(56) References Cited

U.S. PATENT DOCUMENTS 840,582 A * 1/1907 O'Neill ............. A61M 5/16845
340/613
6,284,987 B1 * 9/2001 Al-Modiny ........... F17C 13/023
177/170

(Continued)

FOREIGN PATENT DOCUMENTS

DE 10 2011 014065 9/2012
EP 2 618 039 7/2013
(Continued)

OTHER PUBLICATIONS

French Search Report and Written Opinion for corresponding FR 1656731m dated Mar. 17, 2017.

*Primary Examiner* — Nimeshkumar D Patel
*Assistant Examiner* — Tania Courson
(74) *Attorney, Agent, or Firm* — Elwood L. Haynes (57) ABSTRACT

Gas supply device, comprising a frame equipped with a base and accommodating a plurality of pressurised fluid cylinders connected to a fluidic circuit comprising a first connection end connected to the cylinders and a second end comprising at least one fluidic connection intended to be connected removably to an extraction or filling element for the cylinders, the frame comprising on one of its faces at least one opening giving access to at least one connection of the circuit, the frame also comprising at least one attachment element provided to cooperate with a lifting device.

11 Claims, 5 Drawing Sheets

(51) Int. Cl.
*F17C 7/00* (2006.01)
*F17C 13/08* (2006.01)
*G08B 21/18* (2006.01)
*G01G 15/00* (2006.01)
*G01G 3/16* (2006.01)
*G01G 17/04* (2006.01)
*G01N 35/10* (2006.01)
*G01N 35/00* (2006.01)

(52) U.S. Cl.
CPC ...... *G08B 21/18* (2013.01); *F17C 2201/0104* (2013.01); *F17C 2201/032* (2013.01); *F17C 2201/056* (2013.01); *F17C 2205/0107* (2013.01); *F17C 2205/0134* (2013.01); *F17C 2205/0142* (2013.01); *F17C 2205/0188* (2013.01); *F17C 2205/037* (2013.01); *F17C 2223/0123* (2013.01); *F17C 2223/035* (2013.01); *F17C 2250/036* (2013.01); *F17C 2250/0478* (2013.01); *F17C 2260/015* (2013.01); *F17C 2260/042* (2013.01); *F17C 2265/04* (2013.01); *F17C 2270/01* (2013.01); *G01G 3/16* (2013.01); *G01G 15/006* (2013.01); *G01G 17/04* (2013.01); *G01N 35/1002* (2013.01); *G01N 2035/00217* (2013.01)

(58) Field of Classification Search
CPC ........ F17C 2201/056; F17C 2205/0107; F17C 2205/0134; F17C 2205/0142; F17C 2205/0188; F17C 2223/0123; F17C 2223/035; F17C 2250/036; F17C 2250/0478; F17C 2260/015; F17C 2260/042; F17C 2265/04; F17C 2270/01; G08B 21/18; G01G 15/006; G01G 3/16; G01G 17/04; G01N 35/1002; G01N 2035/00217

See application file for complete search history.

(56) References Cited

U.S. PATENT DOCUMENTS

| | | | |
|---|---|---|---|
| 6,343,627 B1 * | 2/2002 | Hasaka | F17C 5/06 141/18 |
| 6,406,519 B1 * | 6/2002 | Tom | B01D 53/0446 95/105 |
| 6,968,805 B1 * | 11/2005 | Rathbun | F17C 13/02 116/227 |
| 7,017,741 B1 * | 3/2006 | Williamson | F17C 13/084 206/386 |
| 8,016,300 B2 * | 9/2011 | Cramer | B62B 5/049 137/899.3 |
| 9,285,262 B2 * | 3/2016 | Kneubuehl | G01G 3/16 |
| 2001/0032504 A1 * | 10/2001 | Moseley | G01F 23/20 73/290 R |
| 2014/0026991 A1 | 1/2014 | Verghade et al. | |
| 2014/0150422 A1 | 6/2014 | Brown et al. | |
| 2014/0290797 A1 | 10/2014 | Kriese et al. | |

FOREIGN PATENT DOCUMENTS

EP    2 639 490    9/2013
FR    2 988 158    9/2013

* cited by examiner

GAS SUPPLY DEVICE

CROSS REFERENCE TO RELATED APPLICATIONS

This application claims the benefit of priority under 35 U.S.C. § 119 (a) and (b) to French Patent Application No. 1656731 filed Jul. 13, 2016, the entire contents of which are incorporated herein by reference.

BACKGROUND

The present invention concerns a gas supply device.

SUMMARY

More particularly, the invention concerns a gas supply device comprising a frame equipped with a base and accommodating a plurality of pressurised fluid cylinders connected to a fluidic circuit for ensuring extraction from or filling of the cylinders, said circuit comprising a first connection end connected to the cylinders and a second end comprising at least one fluidic connection intended to be connected removably to an extraction or filling element for the cylinders, the frame comprising on one of its faces at least one opening giving access to at least one connection of the circuit, the frame also comprising at least one attachment element provided to cooperate with a lifting device for the frame.

The invention concerns in particular gas supply devices sometimes known as frames. The invention thus concerns in particular frames for pressurised fluid cylinders, i.e. devices comprising a chassis forming a support for several fluid cylinders. These frames generally comprise at least one common connection for the cylinders. Because of their mass and size, these frames are equipped with handling elements intended to cooperate with lifting gear (cranes and/or forklift trucks).

Many accidents can occur on installations for filling gas cylinder frames or installations for distributing gas from cylinder frames. The most common accident is detachment of the hose connected to the frame during handling of the cylinder frame while the hose is still connected fluidically to the gas filling or distribution installation.

Numerous devices exist on these installations to avoid these potentially dangerous accidents. For example, it is known to use a placard mounted on the frame by the operator as a reminder that the frame must not be moved while fluidically connected. Another known solution is to use an automatic barrier which prevents access to the frame for a forklift truck while the frame is being used. Another solution consists of using automatic signalling devices which are deployed at the time when an extraction or filling hose is connected to the frame.

Document FR2988158A1 describes a solution in which a mechanism for connection and transmission of movement is provided to connect the handling element of the frame to a movable cover giving access to the fluidic connections. This ensures that the handling element (lifting ring for example) is retracted as long as access to the connection is not blocked.

These solutions are however imperfect since they either rely on a human factor or they are difficult to deploy for reasons of cost, mechanical complexity or logistics.

One aim of the present invention is to remedy all or some of the drawbacks of the prior art outlined above.

To this end, the device according to the invention, while conforming to the generic definition given in the introduction above, is essentially characterized in that it comprises at least one sensor for lifting of the frame via the at least one attachment element, and at least one sensor for detecting access to a connection, the device also comprising at least one warning element configured to generate a warning automatically once the lifting sensor detects a lifting of the frame and the access detection sensor detects access to a connection.

Also, embodiments of the invention may comprise one or more of the following characteristics:

- the frame comprises an interface panel, the opening giving access to the connection(s) being arranged in said panel, the sensor for detecting access to the connection(s) being configured to detect access to the connection(s) via said opening,
- the at least one attachment element comprises a lifting ring situated in the upper part of the frame and secured to the structure of the frame, the frame comprising at least one lifting sensor amongst: a sensor for detecting a traction force on the ring, a sensor for detecting a mechanical connection at the ring, the sensor working via a mechanical and/or electrical and/or optical and/or magnetic measurement,
- the ring is movable in translation relative to the base of the frame between a first low position when the frame is not raised via the ring and a second high position when the frame is raised via the ring, the lifting sensor comprising a switch detecting passage of the ring from the first to the second position,
- the ring is mounted so as to slide in a hollow tube of the frame forming a central mast linked to the base of the frame,
- the at least one attachment element comprises one or more housings provided in the base of the frame, said housings being parallel to the base of the frame and configured to receive one or more forks of a lifting machine, the at least one lifting sensor comprising a switch configured to be activated by the introduction or movement of a foreign body such as a fork into at least one housing,
- the ring is secured to the upper end of a shaft mounted so as to slide in the hollow tube, the lower end of said shaft being linked to a platform opening into the housing(s), said platform being movable between a low position and a high position,
- the at least one lifting sensor comprises a switch cooperating with the platform or a piece mechanically linked to the platform,
- the at least one sensor for detecting access to a connection comprises at least one amongst: an electrical sensor, an optical sensor, a mechanical sensor, a magnetic sensor,
- the frame comprises a cover which is movable between a first position closing the at least one opening to prevent access to a connection, and a second opening position allowing access to the connection, the at least one sensor for detecting access to a connection being configured for detecting the open or closed position of said cover,
- the device comprises at least one warning element amongst: an audible warning, a luminous warning,
- the at least one warning element is connected by hardwired connection or wirelessly to said sensor(s).

The invention may also concern any alternative device or method comprising any combination of the characteristics outlined above or below.

BRIEF DESCRIPTION OF THE DRAWINGS

Further features and advantages will appear from reading the description below which is given with reference to the attached figures on which.

DESCRIPTION OF PREFERRED EMBODIMENTS

Figure 1:
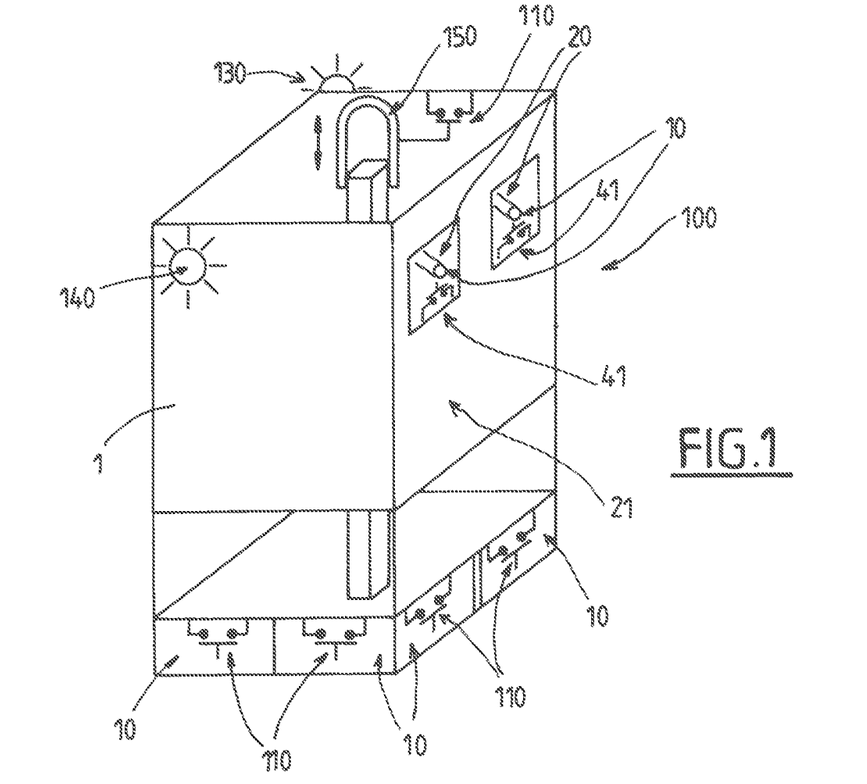
FIG. 1 shows a perspective, diagrammatic and partial view illustrating a possible exemplary embodiment of a device according to the invention.
Figure 2:
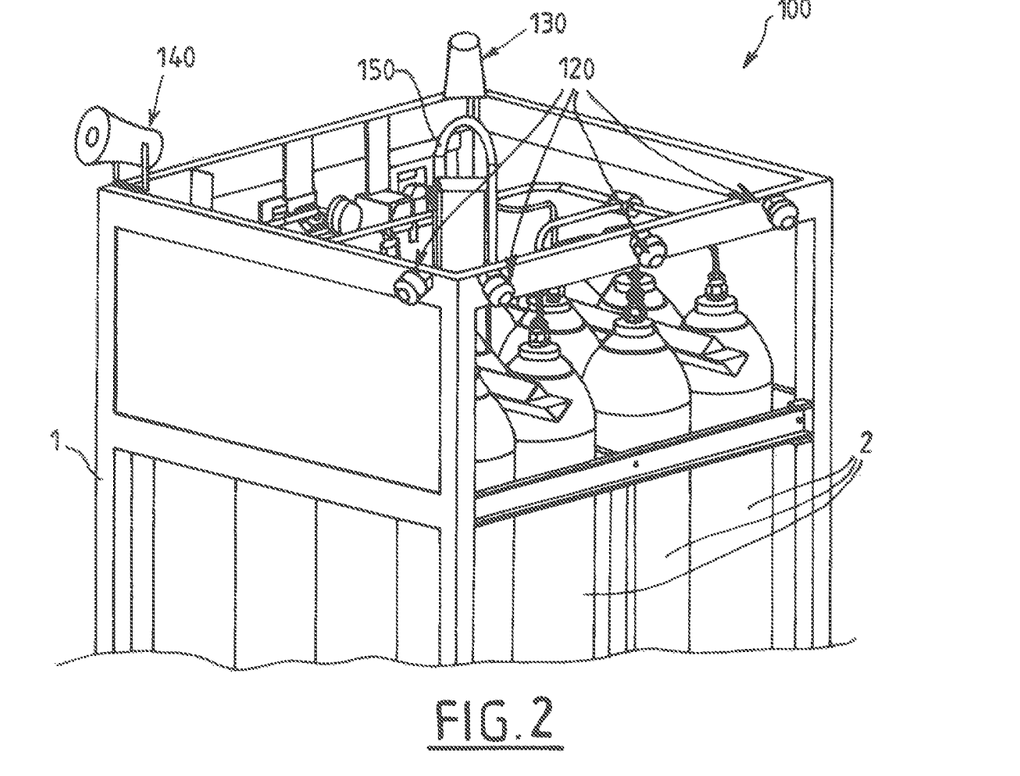
FIG. 2 shows a perspective, diagrammatic and partial view illustrating the upper part of another possible exemplary embodiment of a device according to the invention.
Figure 3:
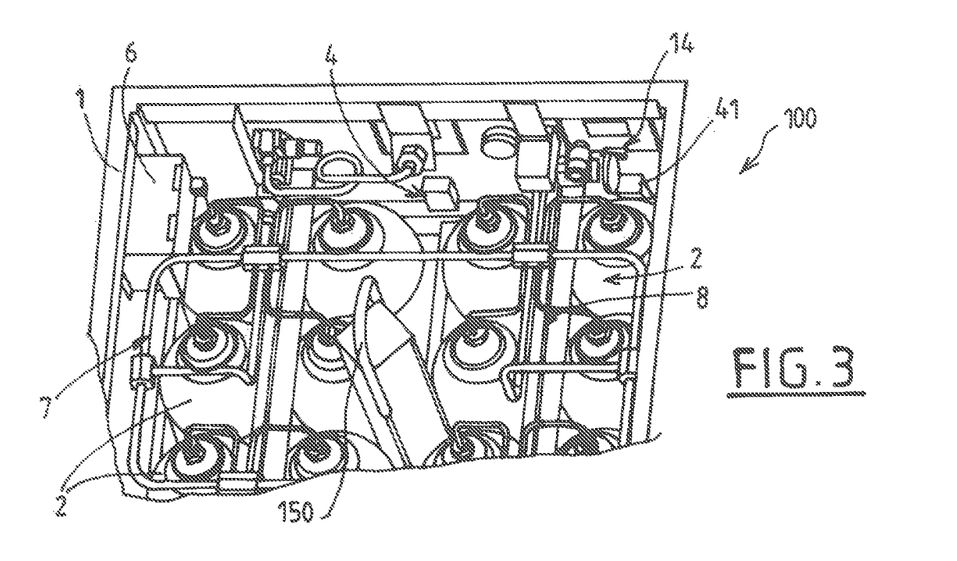
FIG. 3 shows a perspective view from above of a detail of the device in FIG. 2.

The gas supply device 100 illustrated in particular in FIGS. 1 to 3 conventionally comprises a support frame 1, comprising for example a base forming the support of a parallelepipedic framework accommodating a plurality of pressurised fluid cylinders 2 (for reasons of simplification, the cylinders are not shown in FIG. 1).

The frame 1 may conventionally comprise a metal framework with vertical and horizontal components forming a cage.

For example, the cylinders 2 are arranged in a group, vertically on a horizontal base formed by the bottom (sixteen cylinders 2 in this non-limitative example). The openings of the cylinders 2 are connected to a fluidic circuit 7 for extraction from or filling of the cylinders 2.

The circuit 7 may comprise a first end forming a collector and connected to each of the cylinders 2 via for example a first isolating valve and a pressure relief unit. The circuit 7 may comprise, in a fashion known in itself, at least one second connection end (equipped for example with an isolating valve) and comprising a fluidic connection element (connector or other) to allow its connection to a filling or extraction device, for example via a hose.

The frame 1 may comprise on one of its faces (called the front face) an interface panel 21 for a user, comprising at least one opening 20 giving access to the circuit 7 and in particular access to one or more fluidic connections 10 (fast connections or other) intended to allow the transfer of fluid from or to the cylinders 2.

The panel 21 may be a plate and/or a grille, behind which the functional elements are grouped (manometer, valve(s), connectors, control elements for these devices such as manual pressure switches and/or flow switches etc.).

The frame 1 also comprises at least one attachment element intended to cooperate with a lifting device for the frame 1.

For example, the frame 1 may conventionally comprise a lifting ring 150 situated in the upper part of the frame 1 and secured to the structure of the frame 1. The ring 150 is intended to cooperate with a hook 160 of a crane for example (see FIG. 7).

In the example shown, in the lower portion, the frame 1 also comprises housings 16 provided in the base of the frame 1. The housings 16 are parallel to the base of the frame 1 and configured to receive one or preferably two arms of a fork of a lifting machine, such as a forklift truck for example.

According to an advantageous feature, the device comprises at least one sensor 110 for the lifting of the frame 1 via the attachment element(s) 16, 150, and at least one sensor 41 for detecting access to a connection 10 via an opening 20 of the panel. Furthermore, the device also comprises at least one warning element 120, 130, 140 configured to generate an alarm automatically once the lifting sensor 110 detects a lifting of the frame 1 and the access detection sensor 41 detects access to a connection 10 via the opening 20. This means that in response to the simultaneous detection of a lifting operation (or its beginning) and access to a connection (or its beginning or possibility), the warning element in response generates an alarm to a user to indicate that he must interrupt the lifting and verify the safety of the device by checking that the access to the connection is not being used or cannot be used during the handling of the frame 1.

This allows the user to be warned of a risk situation in order to prevent the handling of the frame 1 while a connection 10 is potentially still connected to a hose or similar.

The warning element 120, 130, 140 may comprise at least one amongst an audible warning, a luminous warning (rotating beacon, LED, siren etc.).

Figure 4:
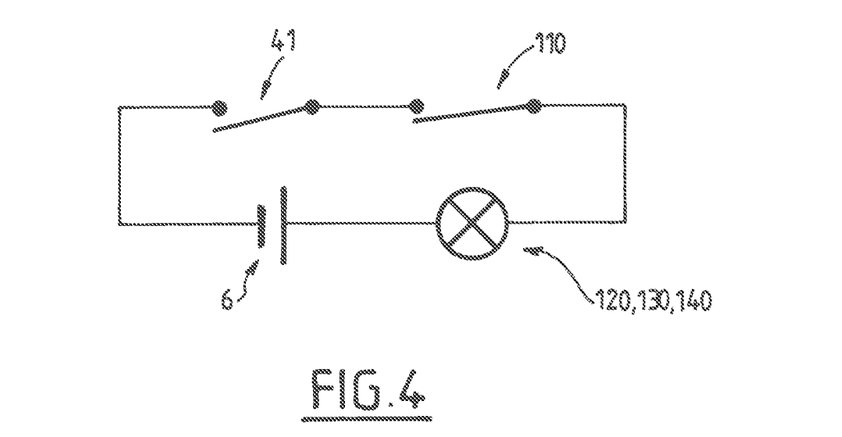
FIG. 4 shows a diagrammatic and partial view illustrating a possible example of the electrical circuit for detection and activation of the alarm of the device according to the invention.

FIG. 4 illustrates diagrammatically a non-limitative example of operation. The two sensors 41, 110 are arranged in series in an electrical circuit, and when both detect the event simultaneously (lifting and access to the connection), they then close the supply circuit to the warning element 120, 130, 140. In the example of FIG. 4, the simplified circuit is of the electrical type and controls an electrical supply to the warning elements via a battery 6. Naturally, other embodiments are possible. For example, the warning elements 120, 130, 140 may be connected to (or may integrate) an electronic logic unit (microprocessor, computer or other) which receives the signals from the sensors 41, 110. The warning elements 120, 130, 140 may receive signals by hard-wired connection or wirelessly from the sensors or the electronic logic unit.

The warning elements 120, 130, 140 may be placed in the upper part of the frame 1, in particular on the metallic framework.

To detect a lifting of the frame via the ring 150, the frame 1 may comprise at least one lifting sensor 110 amongst: a sensor 110 for detecting a traction force on the lifting ring 150, a sensor for detecting a mechanical connection at the lifting ring 150. The sensor 110 concerned may for example perform a mechanical and/or electrical and/or optical and/or magnetic measurement. For example, it is possible that the mechanical connection of a crane hook onto the ring 150 may be detected.

Similarly, to detect a lifting via the lower part of the frame 1, the frame may comprise a lifting sensor 110 comprising a switch situated in the housing(s) 16. The switch 110 may be configured to be activated by the introduction of a foreign body such as a fork in at least one housing 16.

Figure 6:
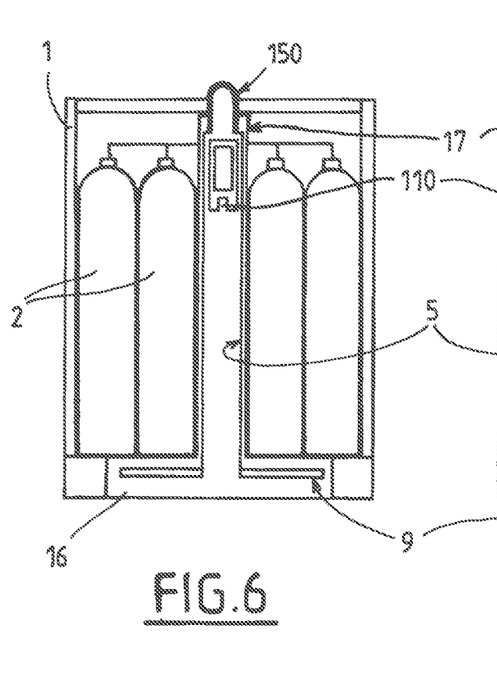
FIG. 6 shows a vertical cross-section, diagrammatic and partial, illustrating a possible embodiment of the device according to the invention.
Figure 7:
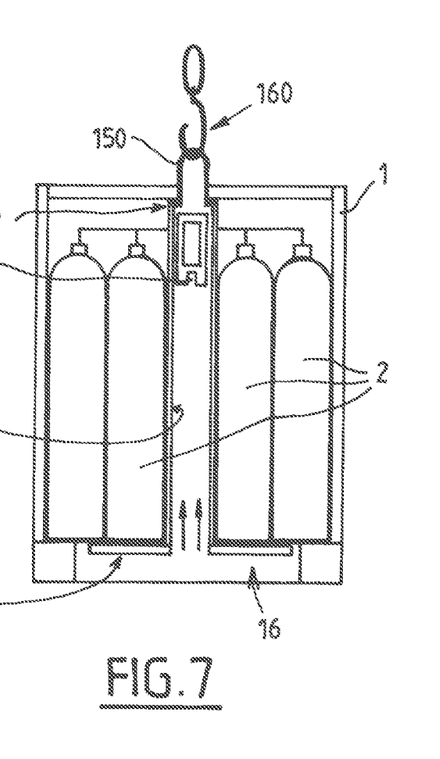
FIG. 7 shows a vertical cross-section, diagrammatic and partial, illustrating a possible embodiment of the device according to the invention.
Figure 8:
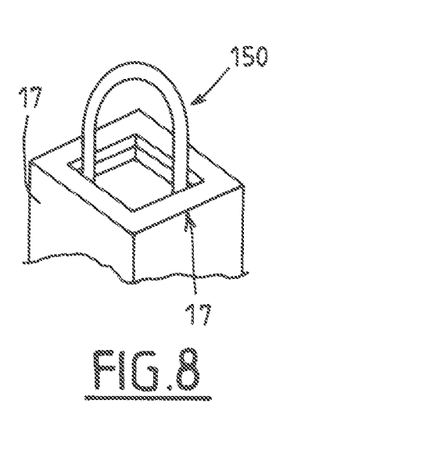
FIG. 8 shows a perspective, diagrammatic and partial view of a detail of the device of FIGS. 6 and 7 illustrating an exemplary structure of the lifting ring.

In a particular possible embodiment shown on FIGS. 6 to 8, the lifting ring 150 may be mounted so as to be movable in translation relative to the base of the frame 1 between a first low position when the frame 1 is not raised via the ring 150 (see FIG. 6), and a second high position (at the stop) when the frame 1 is lifted by the ring 150 (see FIG. 7). The lifting sensor 110 may then comprise a switch or another sensor detecting the passage of the ring 150 from the first to the second position (see FIGS. 6 and 7).

For example and as shown on FIGS. 6 and 7, the lifting ring 150 may be mounted so as to slide in a hollow tube 17 of the frame, this tube 17 forming a central mast linked to the base of the frame 1.

More precisely, the lifting ring 150 may be secured to the upper end of a shaft 5 mounted so as to slide in the hollow tube 17.

Furthermore, the lower end of said shaft may be linked to a lower platform 9. When the frame 1 is raised by the ring 150, the platform 9 comes to rest against a bottom of the base of the frame 1 (see FIGS. 7 and 9) and thus allows the frame 1 to be raised and the force distributed.

Figure 9:
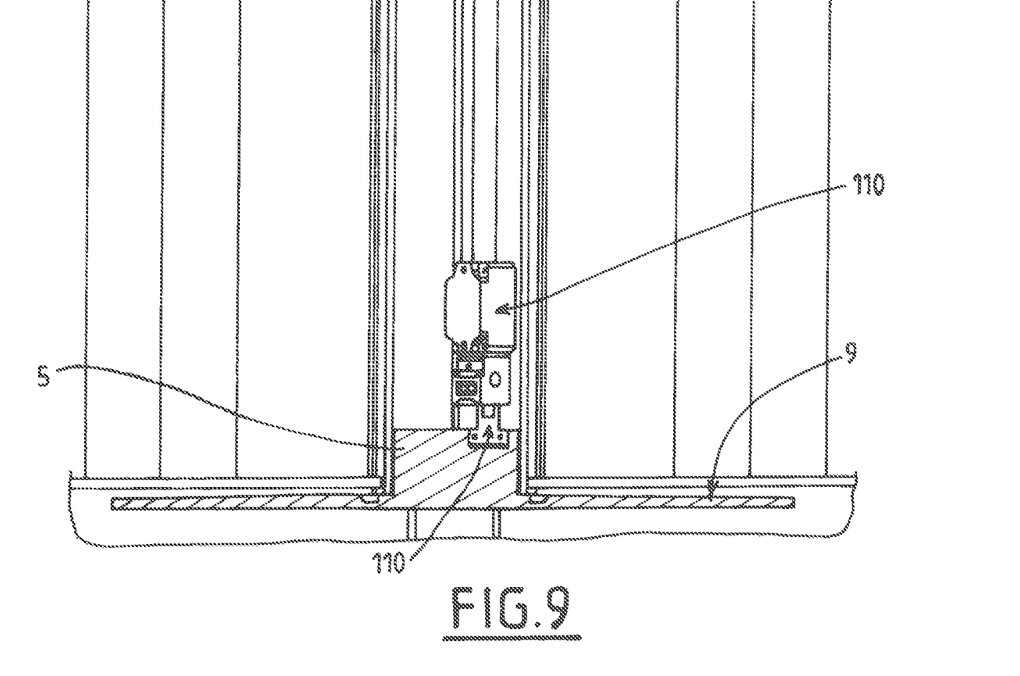
FIG. 9 shows a vertical cross-section, diagrammatic and partial, of a detail of the lower part of a device according to FIGS. 6 and 7, illustrating a lifting sensor of the frame.

This embodiment is not however limitative or preferred. Thus the platform 9 does not necessarily come to a stop in order to raise the frame. For example, in the high position, the platform 9 comes at least to the same level as the reinforcements of the lower structure of the frame which serve as support for the lifting of the frame. This means that when the platform 9 is in the high position, the openings at the base of the frame are cleared to allow lifting of the frame (for example via the arms of a forklift truck).

When lifted by a crane (FIG. 7), the central part equipped with the platform 9 and the lifting ring 150 slides in the central mast 17 of the frame 1 and activates the sensor 110. The kinematics of detection may be the same as those during lifting by a forklift truck (see below).

FIGS. 6 and 7 are longitudinal section views of the frame 1 showing (FIG. 6) the frame at rest (before being lifted), with the lifting ring (ring 150 in the lower position); a sensor 110 may be activated in the case of traction on the ring 150.

As described in more detail below, the platform 9 may in some cases open into the housing(s) 16 and may also form all or part of a mechanism for detecting lifting via the lower part of the frame 1.

This means that the platform 9 is for example movable between a low position (see FIG. 6) and a high position (see FIGS. 7 and 9).

As illustrated on FIG. 9, the at least one lifting sensor 110 may comprise a switch arranged in the lower part of the frame 1 and cooperating with the platform 9, depending on its position, in order to detect the raised or non-raised state.

This means that the forks 18 of a forklift truck may be introduced into the passages 16 of the base of the frame 1 below the platform 9 (introduction in the form of horizontal movement). When the forks 18 are raised (vertical movement to raise the frame 1), they first lift the platform 9 until the latter reaches the high position in the frame 1. This activates the lifting sensor(s) 110.

Figure 10:
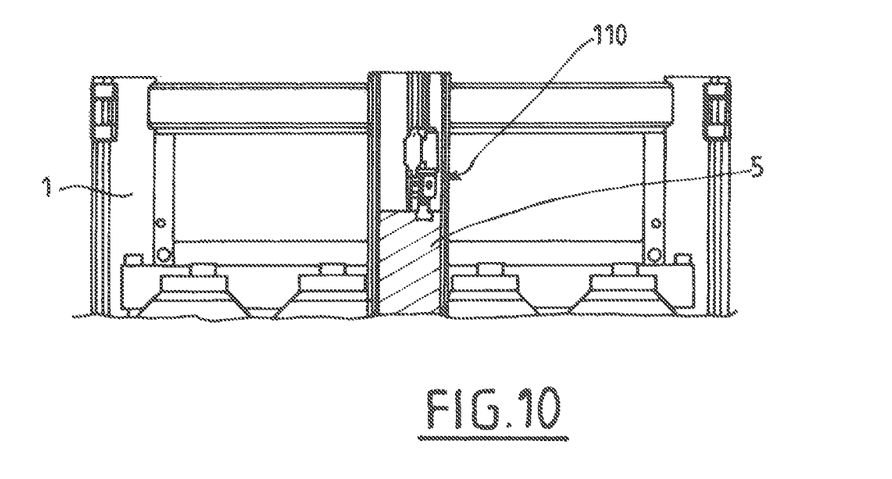
FIG. 10 shows a vertical cross-section, diagrammatic and partial, of a detail of the upper part of a device according to FIGS. 6 and 7, illustrating a lifting sensor of the frame.

As illustrated as a variant or in combination with FIG. 10, the sensor 110 may also be positioned in the top part of the frame 1, in particular to avoid problems of access for maintenance and accelerated degradation from the immediate environment (mud, water, decomposing vegetation etc.). In the top position of the sensor, the forks 18 of the forklift truck are preferably in contact with the framework of the frame before any contact is created between the platform 9 and the floor of the frame, in order not to transmit undesirable force to the frame 1.

Figure 11:
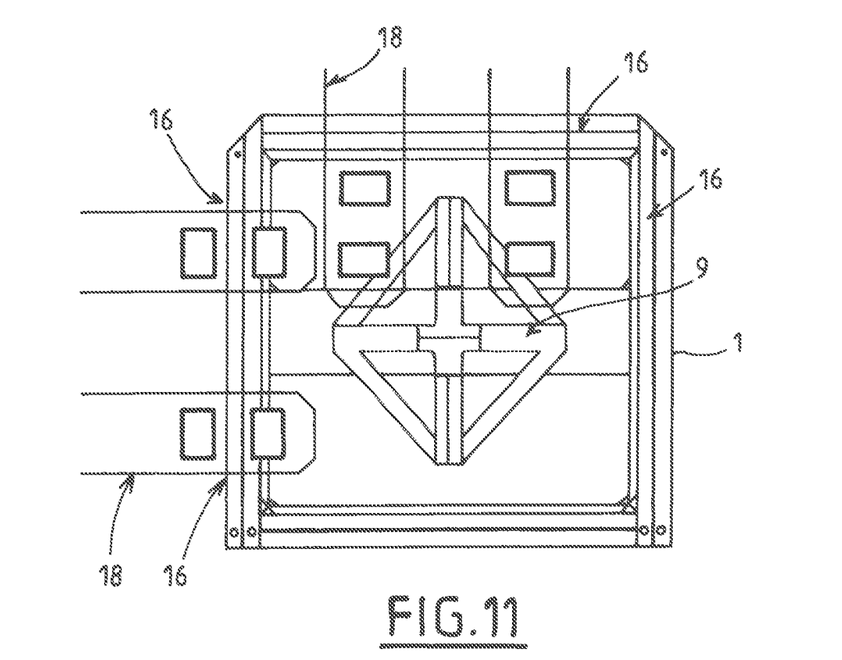
FIG. 11 shows a diagrammatic, partial and transparent view from below of a device according to FIGS. 6 and 7, illustrating the structure of a lifting sensor of the frame.

As illustrated on FIG. 11, the platform 9 may have a flat, parallelepipedic, circular or other shape in order to interfere, in the low position, with a fork 18 which is introduced into the housing 16 on any side of the frame 1 concerned. Alternatively, the platform 9 may be configured to avoid risk of impact on insertion of the forks 18 in the housings 16.

Similarly, the platform 9 may comprise inclined faces (for example tilted downward towards the inside of the frame 1). When the forks 18 are introduced in the housings 16, in the case where the platform 9 lies on the path of the forks 18, the inclined faces of the platform 9 may induce a resultant force on the platform 9 which tends to raise it in order to clear the passage for the forks 18. This raising of the platform 9 under the action of the forks 18 entering the housings 16 activates the lifting sensor(s) 110.

The platform 9 thus allows detection irrespective of angle of entry of the fork 18 (in the case where housings 16 are provided on several adjacent faces of the frame 1).

To detect access to a connection 10 via an opening 20 of the panel, the device may comprise a sensor 41 directly at the level of the connection 10 in order to detect a mechanical connection of the connection 10 with an extraction or filling element. As before, the sensor 41 for access to the connection 10 may be mechanical, electrical, magnetic, or optical and may in particular comprise a switch or any other suitable element.

Figure 5:
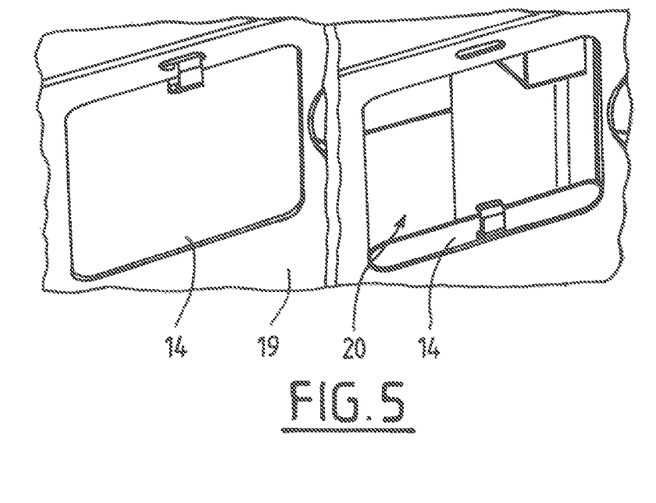
FIG. 5 shows two perspective views of a detail of the front face of the device of FIG. 1 or 2, illustrating an opening of an interface panel in two separate respective access configurations (closed and open respectively)
Figure 12:
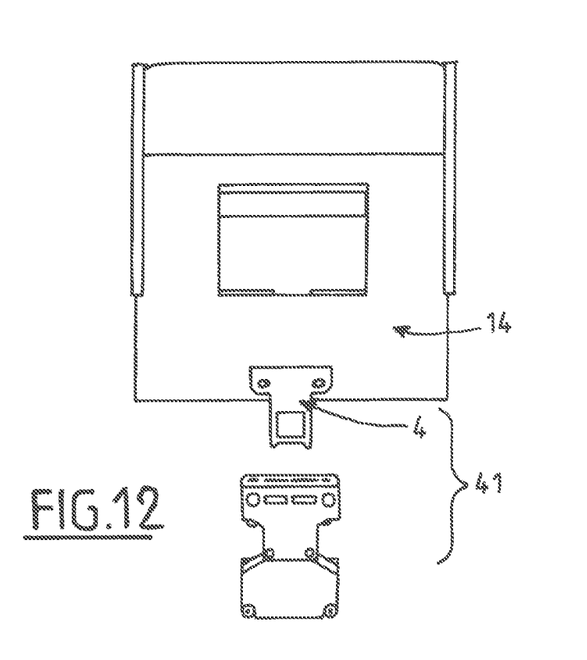
FIG. 12 shows a diagrammatic and partial view from the front, illustrating an exemplary system for detecting the position of a cover or flap such as that in FIG. 5.

In an embodiment illustrated on FIGS. 5 and 12, the frame 1 comprises a cover 14 or flap which is movable between a first position (preferably stable) closing at least one opening 20 in order to prevent access to a connection 10, and a second opening position (preferably stable) allowing access to the connection 10. The at least one sensor 41 for detecting access to a connection 10 may be a sensor configured to detect the open or closed position of said cover 14. The open position of the cover 14 is regarded as access to the connection 10. This means that, to allow lifting of the frame without triggering an alarm, the cover 14 must be in the closed position.

The cover 14 is for example movable in translation and/or rotation and allows access to the filling or extraction connections only in the open position.

FIG. 12 illustrates an exemplary arrangement of the sensor 41 for the position of the cover 14, with a male part 4 which is for example secured to the movable cover 14, and a female part 14 which is for example secured to a fixed part of the frame 1. The assembly 41 may for example form a switch (such as a microswitch).

FIG. 3 illustrates an exemplary arrangement of the main elements housed inside the frame: cylinders 2, circuit 7, cover 14, sensor 41, battery 6, bars 8 for supporting the cylinders 2.

The detection and/or warning system may comprise electrical components supplied by the battery 6, and/or a solar panel or any other appropriate means.

What is claimed is:

1. A gas supply device comprising a frame equipped with a base and accommodating a plurality of pressurised fluid cylinders connected to a fluidic circuit for ensuring extraction from or filling of the pressurized fluid cylinders, said circuit comprising a first connection end connected to the pressurized fluid cylinders and a second end comprising at least one fluidic connection intended to be connected removably to an extraction or filling element for the pressurized fluid cylinders, the frame comprising on one of its faces at least one opening giving access to at least one connection of the circuit, the frame also comprising at least one attachment element provided to cooperate with a lifting device for the frame, wherein the device comprises at least one sensor for lifting of the frame via the at least one attachment element and at least one sensor for detecting access to a connection, the device also comprising at least one warning element configured to generate a warning automatically once the lifting sensor detects a lifting of the frame and the access detection sensor detects access to a connection.

2. The device of claim 1, wherein the frame comprises an interface panel, the opening giving access to the connection (s) being arranged in said panel, the sensor for detecting access to the connection(s) being configured to detect access to the connection(s) via said opening.

3. The device of claim 1, wherein the at least one attachment element comprises a lifting ring situated in the upper part of the frame and secured to the structure of the frame, the frame comprising at least one lifting sensor amongst: a sensor for detecting a traction force on the ring, a sensor for detecting a mechanical connection at the ring, the sensor working via a mechanical and/or electrical and/or optical and/or magnetic measurement.

4. The device of claim 3, wherein the ring is movable in translation relative to the base of the frame between a first low position when the frame is not raised via the ring and a second high position when the frame is raised via the ring, the lifting sensor comprising a switch detecting passage of the ring from the first to the second position.

5. The device of claim 4, wherein the ring is mounted so as to slide in a hollow tube of the frame forming a central mast linked to the base of the frame.

6. The device of claim 5, wherein the ring is secured to the upper end of a shaft mounted so as to slide in the hollow tube, and the lower end of said shaft is linked to a platform opening into the housing(s), said platform being movable between a low position and a high position.

7. The device of claim 6, wherein the at least one lifting sensor comprises a switch cooperating with the platform or a piece mechanically linked to the platform.

8. The device of claim 1, wherein the at least one sensor for detecting access to a connection comprises at least one amongst: an electrical sensor, an optical sensor, a mechanical sensor, a magnetic sensor.

9. The device of claim 1, wherein the frame comprises a cover which is movable between a first position closing the at least one opening to prevent access to a connection and a second opening position allowing access to the connection, and that the at least one sensor for detecting access to a connection is configured for detecting the open or closed position of said cover.

10. The device of claim 1, further comprising at least one warning element amongst: an audible warning, a luminous warning.

11. The device of claim 1, wherein the at least one warning element is connected by hard-wired connection or wirelessly to said sensors.

* * * * *